2,844,604
Patented July 22, 1958

2,844,604
STEROIDS

John A. Hogg, Kalamazoo Township, Kalamazoo County, Philip F. Beal, Portage Township, Kalamazoo County, and Frank H. Lincoln, Jr., Kalamazoo Township, Kalamazoo County, Mich., assignors to The Upjohn Company, Kalamazoo, Mich., a corporation of Michigan No Drawing. Application June 10, 1955
Serial No. 514,785

6 Claims. (Cl. 260—397.45)

This invention relates to 11β,21-dihydroxy-4,17(20)-[cis]-pregnadiene-3-one and 21-acyl esters thereof which may be represented by the following structural formula:

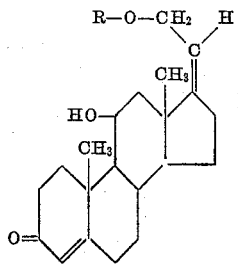

wherein R is hydrogen or the acyl radical of a hydrocarbon carboxylic acid containing from one to twelve carbon atoms, inclusive.

This application is a continuation-in-part of our copending applications S. N. 307,385, filed August 30, 1952, now U. S. Patent 2,774,776; S. N. 345,677, filed March 30, 1953, now U. S. Patent 2,715,621; and S. N. 447,676, filed August 3, 1954, now abandoned. Those applications disclose a method for the producton of 11β,21-dihydroxy-4,17(20)-pregnadiene-3-one and 21-acyl esters thereof. We have now found that the method disclosed in those applications produces the 17(20)-cis isomer, almost exclusively, at the reaction temperatures of the examples.

It is an object of the present invention to provide the novel 11β,21-dihydroxy-4,17(20)-[cis]-pregnadiene-3-one and 21-esters thereof. Another object is the provision of these compounds substantially free from their 17(20)-[trans] isomers. Other objects of the invention will be apparent to those skilled in the art to which this invention pertains.

The compounds of the present invention are useful as intermediates in the production of physiologically active steroids and possess physiological activity per se. For example, the oxidative hydroxylation of 11β,21-dihydroxy-4,17(20)-[cis]-pregnadiene-3-one and 21-esters thereof with osmium tetroxide and an oxidizing agent such as, for example, hydrogen peroxide, a peracid, an amine oxide peroxide, etc., is productive of hydrocortisone and 21-esters thereof as disclosed more fully in copending application Ser. No. 307,385.

Oxidation of 11β,21-dihydroxy-4,17(20)-[cis]-pregnadiene-3-one with manganese dioxide is productive of 3-keto - 11β - hydroxy - 4,17(20) - [cis]-pregnadiene-21-al, which can be hydroxylated with osmium tetroxide, either in the presence or absence of hydrogen peroxide, and then rearranged by heating with pyridine to produce hydrocortisone, as disclosed in the copending application S. N. 360,374 of Beal and Hogg, filed June 8, 1953, now U. S. Patent 2,732,834.

Oxidation of 11β,21-dihydroxy-4,17(20)-[cis]-pregnadiene-3-one or 21-acyl ester thereof with chromic acid in glacial acetic acid, in the presence of pyridine, is productive of 21-hydroxy-4,17(20)-[cis]-pregnadiene-3,11-dione and 21-esters thereof, respectively. These compounds can be oxidatively hydroxylated with osmium tetroxide and hydrogen peroxide or other oxidizing agent to cortisone and 21-acyl esters thereof, respectively, as disclosed in Ser. No. 307,385.

11β,21 - dihydroxy - 4,17(20) - [cis] - pregnadiene - 3-one possesses antibacterial activity, especially against *Staphylococcus haemolyticus* and *Bacillus subtilis*.

In the U. S. Patents 2,662,816 and 2,662,854 of Miescher et al., reference is made to a Δ⁴,¹⁷-3-keto-11β-hydroxy-21-acetoxy-pregnadiene. Although a method of preparation for this compound is not disclosed therein and the compound is not otherwise disclosed in the prior art, all of the methods known in the prior art which might be adapted to produce this compound would result in the production of 11β - hydroxy - 21 - acetoxy-4,-17(20) - [trans] - pregnadiene-3-one. For example, the method disclosed by Miescher et al., Helv. Chim. Acta, 22, 120 (1939), for the production of the corresponding 11-desoxy compound has been shown by Fieser and Fieser, "Natural Products Related to Phenanthrene," third edition, pages 410 to 452, especially page 414 (1949), to result in the trans configuration at the 17(20)-double bond.

According to Fieser and Fieser, a 17(20)-[trans]-steroid results in the production of 20β-hydroxy steroids upon hydroxylation with osmium tetroxide. We have found that the hydroxylation of 11β-hydroxy-21-acetoxy-4,17(20) - [trans] - pregnadiene-3-one with osmium tetroxide results in the production of 11β,17α,20β-trihydroxy-21-acetoxy-4-pregnene-3-one, (Reichstein's Compound E acetate). Hydroxylation of 11β-hydroxy-21-acetoxy-4,17(20)-[cis]-pregnadiene-3-one, a compound of the present invention, results in the production of the epimeric 11β,17α,20α - trihydroxy-21-acetoxy-4-pregnene-3-one.

The novel compounds of the present invention, i. e., 11β,21 - dihydroxy - 4,17(20) - [cis] - pregnadiene-3-one and 21-esters thereof have advantages over the corresponding 17(20)-trans isomers. For example, in an oxidative hydroxylation, e. g., with hydrogen peroxide and osmium tetroxide according to the method described by Miescher et al., employing the cis isomer of 11β-hydroxy-21-acetoxy-4,17(20)-pregnadiene-3-one as starting steroid results in the production of greater yields of hydrocortisone acetate than the identical oxidative hydroxylation of the trans isomer. This advantage has been found in other hydroxylations employing other hydroxylating and oxidizing agents, as shown in the comparative example hereinafter. The other cis compounds of the present invention possess a similar advantage over the corresponding trans isomers. A preferred aspect of the present invention, therefore, is the novel 11β,21-dihydroxy - 4,17(20) - [cis]-pregnadiene-3-one and 21-esters thereof substantially free from their 17(20) - [trans]-isomers.

11β,21-dihydroxy-4,17(20)-[cis]-pregnadiene-3-one is prepared from 11-ketoprogesterone by the following reactions, all as more fully disclosed in our copending application S. N. 307,385: 11-ketoprogesterone is reacted with about one mole of sodium methoxide and a molar equivalent or more of diethyl oxalate to produce the sodium enolate of 21-ethoxyoxalyl-11-ketoprogesterone. Dibrominating this latter compound with two molar equivalents of bromine is productive of 21-ethoxyoxalyl-21,21-dibromo-11-keto-progesterone which is converted by sodium methoxide in methanol to 3,11-diketo-4, 17(20)-[cis]-pregnadiene-21-oic acid methyl ester. The temperature of conversion governs the stereo-configuration of this latter compound, as disclosed in co-pending application S. N. 319,173 (now U. S. Patent 2,752,366). At temperatures of thirty degrees centigrade and below the 17(20)-cis isomer predominates. It can be separated in crude form from the reaction mixture by chromatographic methods and purified by recrystallization. It melts at temperatures above 207 degrees centigrade. The trans stereo-isomer which forms at higher reaction temperatures melts at above 155 degrees centigrade. This latter compound is ketalized with ethylene glycol in the presence of para-toluenesulfonic acid in boiling benzene with a water trap to the 3-ethylene glycol ketal of 3,11-diketo-4,17(20)-[cis]-pregnadiene-21-oic acid methyl ester. Reduction of the latter compound with lithium aluminum hydride in ether is productive of the 3-ethylene glycol ketal of 11β,21-dihydroxy-4,17(20)-[cis]-pregnadiene-3-one which is hydrolyzed with sulfuric acid in aqueous acetone to 11β,21-dihydroxy-4,17(20)-[cis]-pregnadiene-3-one. Esterification of 11β,21-dihydroxy-4,17(20)-[cis]-pregnadiene-3-one with an acid anhydride, acid chloride or bromide or acid, in the presence of an esterification catalyst, is productive of an 11β-hydroxy-21-acyloxy-4,17(20)-[cis]-pregnadiene-3-one.

Refluxing a solution of methyl 3-keto-11β-hydroxy-4,17(20)-[cis]-pregnadiene-21-oate and sodium methoxide in methanol converts the compound to methyl 3-keto-11β-hydroxy-4,17(20)-[trans]-pregnadiene-21-oate. This compound is converted to 11β,21-dihydroxy-4,17(20)-[trans]-pregnadiene-3-one and 11β-hydroxy-21-acyloxy-4,17(20)-[trans]-pregnadiene-3-ones in the same manner as the cis isomer is converted to the corresponding cis compounds.

The following examples are illustrative of the compounds of the present invention and a method for their production, but are not to be construed as limiting.

EXAMPLE 1

*11β,21-dihydroxy-4,17(20)-[cis]-pregnadiene-3-one*

A solution of 0.572 gram (0.0015 mole) of the 3-ethylene glycol ketal of 11β,21-dihydroxy-4,17(20)-[cis]-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water was then added, the methylene chloride layer removed, and the solvent distilled therefrom. The residue, after drying in vacuo, consisted of the theoretical 0.518 gram of 11β,21-dihydroxy-4,17(20)-[cis]-pregnadiene-3-one.

One crystallization of this product from a mixture of ethyl acetate and Skellysolve B hexane hydrocarbons gave crystals of 11β,21-dihydroxy-4,17(20)-[cis]-pregnadiene-3-one melting at 156 to 158 degrees centigrade and having an $[\alpha]_D^{23}$ of plus 128 degrees in acetone.

*Analysis.*—Calculated for $C_{21}H_{30}O_3$: C, 76.32; H, 9.15. Found: C, 76.04, 75.83; H, 9.43, 9.40.

EXAMPLE 2

*11β-hydroxy-21-acetoxy-4,17(20)-[cis]-pregnadiene-3-one*

A solution of 0.518 gram of 11β,21-dihydroxy-4,17(20)-[cis]-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)-[cis]-pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield, as the first crop, 0.253 gram, a yield of 45 percent of the theoretical, of 11β-hydroxy-21-acetoxy-4,17(20)-[cis]-pregnadiene-3-one melting at 183 to 186 degrees centigrade.

*Analysis.*—Calculated for $C_{23}H_{32}O_4$: C, 74.16; H, 8.66. Found: C, 74.18, 73.95; H, 8.45, 8.74.

Similarly, 11β,21-dihydroxy-4,17(20)-[cis]-pregnadiene-3-one is converted to other 11β-hydroxy-21-acyloxy-4,17(20)-[cis]-pregnadiene-3-ones by esterification of the 21-hydroxy group, e. g., by reaction with the appropriate acid anhydride, acid chloride, or bromide, ester by ester exchange, acid in the presence of an esterification catalyst, etc. Examples of 11β-hydroxy-21-acyloxy-4,17(20)-[cis]-pregnadiene-3-one prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e. g., cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2, 3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic α-naphthoic, 3-methyl-α-naphthoic, and aralkyl acid, e. g., phenylacetic, phenylpropionic, etc.

*Oxidative hydroxylations of the cis and trans isomers of 11β-hydroxy-21-acetoxy-4,17(20)-pregnadiene-3-one*

To a solution of 1.11 grams (3.0 m. moles) of the cis or trans isomer of 11β-hydroxy-21-acetoxy-4,17(20)-pregnadiene-3-one in fifty milliliters of tertiary butyl alcohol was added 1.5 milliliters of pyridine followed by a solution of six millimoles of N-methylmorpholine oxide peroxide in five milliliters of tertiary butyl alcohol followed by a solution of 16.6 milligrams of osmium tetroxide in nine milliliters of tertiary butyl alcohol. The N-methylmorpholine oxide peroxide was prepared by the reaction six millimoles of N-methylmorpholine with twelve millimoles of anhydrous hydrogen peroxide in tertiary butyl alcohol. After stirring the mixture at room temperature for eighteen hours, a solution of 23 milliliters of aqueous five percent sodium sulfite was added and stirring was continued for another 25 minutes. The reaction mixture was then concentrated by distillation at room temperature and reduced vacuum and fifty milliliters of water was then added portionwise over a period of 35 minutes. The precipitated steroid was filtered, washed with a mixture of tertiary butyl alcohol and water and dried. In the reaction with the cis isomer, a second crop of crystals were obtained upon concentration of the combined filtrate and wash. The final mother liquor in both reactions was concentrated by dryness and the solids thus obtained weighed and analyzed by papergram. The results of the two oxidative hydroxylations are shown below.

| | Cis Isomer | Trans Isomer |
|---|---|---|
| 1st crop_____grams__ | 0.63 | 0.30 |
| M. P._____° C__ | 218–220 | 216–218.5 |
| U. V. (E)_____ | 15,950 | 15,875 |
| $\alpha_D$ (acetone)_____degrees__ | +131 | +137 |
| Mother Liquor_____gram | 0.45 | 0.82 |
| Percent F acetate (papergram)_____ | 5 | 15 |

The second crop from the oxidative hydroxylation of the cis isomer weighed 0.14 gram and analyzed sixty percent F acetate by papergram. Thus the cis isomer was converted to 736 milligrams of F acetate (11β,17α-dihydroxy-21-acetoxy-4-pregnene-3,20-dione), a yield of 66.3 percent of the theoretical, whereas the trans isomer was converted to only 423 milligrams of F acetate, a yield of 38.1 percent of the theoretical.

We claim:
1. 11β,21-dihydroxy-4,17(20)-[cis]-pregnadiene-3-one and 21-esters thereof of the following formula

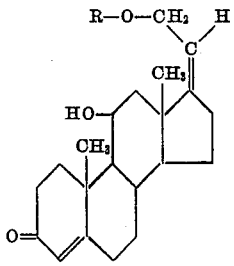

wherein R is selected from the group consisting of hydrogen and the acyl radical of a hydrocarbon carboxylic acid containing from one to twelve carbon atoms, inclusive.

2. 11β-hydroxy-21-acyloxy-4,17(20)-[cis]-pregnadiene-3-one of the following formula

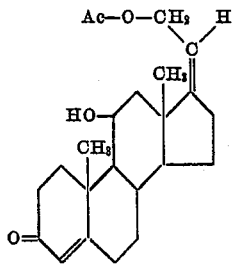

wherein Ac is the acyl radical of a hydrocarbon carboxylic acid containing from one to twelve carbon atoms, inclusive.

3. 11β-hydroxy-21-acetoxy-4,17(20)-[cis]-pregnadiene-3-one.
4. 11β,21-dihydroxy-4,17(20)-[cis]-pregnadiene-3-one.
5. 11β-hydroxy-21-acetoxy-4,17(20)-[cis]-pregnadiene-3-one substantially free from its 17(20)-[trans] isomer.
6. 11β,21-dihydroxy-4,17(20)-[cis]-pregnadiene-3-one substantially free from its 17(20)-[trans] isomer.

References Cited in the file of this patent
UNITED STATES PATENTS

| | | |
|---|---|---|
| 2,662,854 | Miescher | Dec. 15, 1953 |
| 2,668,816 | Miescher | Feb. 9, 1954 |
| 2,694,080 | Colton | Nov. 9, 1954 |
| 2,695,906 | Hogg | Nov. 30, 1954 |
| 2,707,184 | Hogg | Apr. 26, 1955 |
| 2,715,621 | Hogg | Aug. 16, 1955 |

OTHER REFERENCES

Fieser et al.: Natural Products Related to Phenanthrene, 3rd ed., pp. 412–19 (1949).